United States Patent
Abraham et al.

(10) Patent No.: US 7,564,814 B2
(45) Date of Patent: Jul. 21, 2009

(54) TRANSMISSION MODE AND RATE SELECTION FOR A WIRELESS COMMUNICATION SYSTEM

(75) Inventors: Santosh Abraham, San Diego, CA (US); Arnaud Meylan, San Diego, CA (US); Jay Rodney Walton, Carlisle, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 199 days.

(21) Appl. No.: 11/101,086

(22) Filed: Apr. 6, 2005

(65) Prior Publication Data

US 2005/0249159 A1    Nov. 10, 2005

Related U.S. Application Data

(60) Provisional application No. 60/569,201, filed on May 7, 2004.

(51) Int. Cl.
*H04W 4/00* (2006.01)
(52) U.S. Cl. .................. 370/329; 370/208; 370/335; 370/339; 455/67.13
(58) Field of Classification Search .............. 370/329, 370/200, 203, 208, 334, 335, 339; 342/367, 342/368; 375/260; 455/67.13, 63.1, 67.11, 455/562.1, 92, 151.1, 13, 67; 700/53, 46
See application file for complete search history.

(56) References Cited

U.S. PATENT DOCUMENTS 5,923,650 A    7/1999    Chen et al.

| 6,252,854 | B1 | 6/2001 | Hortensius et al. |
| 6,438,104 | B1 | 8/2002 | Fodor et al. |
| 6,452,917 | B1 * | 9/2002 | Leung ................ 370/342 |

(Continued)

FOREIGN PATENT DOCUMENTS

EP    1089500    4/2001

(Continued)

OTHER PUBLICATIONS

Mangold, et al.: "IEEE 802.11e Wireless LAN for Quality of Service," Feb. 2002, pp. 1-8, XP002251598.

(Continued)

*Primary Examiner*—Matthew D Anderson
*Assistant Examiner*—Shaima Q Aminzay
(74) *Attorney, Agent, or Firm*—Mary Fales (57) ABSTRACT

To select a transmission mode to use for a data transmission via a MIMO channel from station A to station B, station A obtains channel information used for spatial processing and determines the age of this information. Station A selects one of multiple transmission modes based on the age of the channel information and possibly other information (e.g., the fading characteristic of the MIMO channel). To select rate(s) to use for the data transmission, station A obtains channel state information (CSI) indicative of the received signal quality for the MIMO channel, e.g., received SNRs or "initial" rates. Station A determines the age of the CSI and selects one or more "final" rates based on the CSI, the age of the CSI, the selected transmission mode, and possibly other information. Station A processes data in accordance with the selected transmission mode and final rate(s) and transmits the processed data to station B.

22 Claims, 5 Drawing Sheets

U.S. PATENT DOCUMENTS

| | | | |
|---|---|---|---|
| 6,898,441 B1* | 5/2005 | Kogiantis et al. | 455/562.1 |
| 6,961,311 B2 | 11/2005 | Rakotoarivelo et al. | |
| 7,145,895 B2 | 12/2006 | Mueckenheim et al. | |
| 7,158,504 B2 | 1/2007 | Kadaba et al. | |
| 7,236,459 B1 | 6/2007 | Okholm et al. | |
| 7,260,073 B2 | 8/2007 | Sipola | |
| 7,280,513 B2 | 10/2007 | Cao et al. | |
| 2001/0024173 A1* | 9/2001 | Katz | 342/367 |
| 2003/0003880 A1* | 1/2003 | Ling et al. | 455/92 |
| 2003/0076797 A1* | 4/2003 | Lozano | 370/334 |
| 2003/0198312 A1 | 10/2003 | Budka et al. | |
| 2003/0202574 A1 | 10/2003 | Budka et al. | |
| 2003/0223365 A1 | 12/2003 | Kowalski | |
| 2004/0042556 A1 | 3/2004 | Medvedev et al. | 375/260 |
| 2004/0082356 A1 | 4/2004 | Walton et al. | 455/522 |
| 2004/0109433 A1 | 6/2004 | Khan | |
| 2004/0156367 A1 | 8/2004 | Albuquerque et al. | |
| 2004/0204104 A1* | 10/2004 | Horng et al. | 455/562.1 |
| 2004/0266451 A1 | 12/2004 | Stolyar et al. | |
| 2005/0111462 A1 | 5/2005 | Walton et al. | |
| 2005/0152465 A1* | 7/2005 | Maltsev et al. | 375/260 |
| 2006/0193294 A1* | 8/2006 | Jorswieck et al. | 370/334 |

FOREIGN PATENT DOCUMENTS

| | | |
|---|---|---|
| WO | 01076110 | 10/2001 |
| WO | 04030287 | 4/2004 |
| WO | WO 2004/038985 A2 | 5/2004 |

OTHER PUBLICATIONS

International Search Report-PCT/US2005/015818. International Searching Authority-European Patent Office-Dec. 23, 2005.

Written Opinion-PCT/US2005/015818, International Searching Authority-European Patent Office-Dec. 23, 2005.

International Preliminary Report on Patentability-PCT/US2005/015818, International Preliminary Examining Authority-Alexandria, Virginia, USA-May 13, 2007.

* cited by examiner

TRANSMISSION MODE AND RATE SELECTION FOR A WIRELESS COMMUNICATION SYSTEM

I. CLAIM OF PRIORITY UNDER 35 U.S.C. §119

The present Application for Patent claims priority to Provisional Application Ser. No. 60/569,201, entitled "Transmission Mode Selection and Rate Selection for a Wireless Communication System," filed May 7, 2004, and assigned to the assignee hereof and hereby expressly incorporated by reference herein.

BACKGROUND

I. Field

The present invention relates generally to communication, and more specifically to transmission mode and rate selection for a wireless communication system.

II. Background

A wireless multiple-input multiple-output (MIMO) system employs multiple ($N_T$) transmit antennas at a transmitting entity and multiple ($N_R$) receive antennas at a receiving entity for data transmission. A MIMO channel formed by the $_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher throughput and/or redundantly to achieve greater reliability.

Each spatial channel may experience various deleterious channel conditions such as, e.g., fading, multipath, and interference effects. The $N_S$ spatial channels may experience different channel conditions and may achieve different signal-to-noise-and-interference ratios (SNRs). The SNR of each spatial channel determines its transmission capacity, which is typically quantified by a particular data rate that may be reliably transmitted on the spatial channel. For a time variant MIMO channel, the channel condition changes over time and the SNR of each spatial channel also changes over time. The different SNRs for different spatial channels plus the time varying nature of the SNR for each spatial channel make it challenging to efficiently transmit data in a MIMO system.

There is therefore a need in the art for techniques to efficiently transmit data in a time-varying wireless system.

SUMMARY

Techniques for selecting a suitable transmission mode and one or more suitable rates for data transmission in a wireless (e.g., MIMO) communication system are described herein. According to an embodiment of the invention, a method is provided in which the age of channel information available for use to transmit data via a wireless channel is determined. A transmission mode is selected from among multiple transmission modes based on the age of the channel information. Data is transmitted via the wireless channel in accordance with the selected transmission mode.

According to another embodiment, an apparatus is described which includes a controller and a spatial processor. The controller determines the age of channel information available for use to transmit data via a wireless channel and selects a transmission mode from among multiple transmission modes based on the age of the channel information. The spatial processor spatially processes data in accordance with the selected transmission mode.

According to yet another embodiment, an apparatus is described which includes means for determining the age of channel information available for use to transmit data via a wireless channel and means for selecting a transmission mode from among multiple transmission modes based on the age of the channel information.

According to yet another embodiment of the invention, a method is provided in which channel state information indicative of received signal quality for a wireless channel used for data transmission is obtained. The age of the channel state information is determined. At least one rate is selected for data transmission via the wireless channel based on the channel state information and the age of the channel state information.

According to yet another embodiment, an apparatus is described which includes a controller and a data processor. The controller obtains channel state information indicative of received signal quality for a wireless channel used for data transmission, determines the age of the channel state information, and selects at least one rate for data transmission via the wireless channel based on the channel state information and the age of the channel state information. The data processor processes data in accordance with the at least one rate selected by the controller.

According to yet another embodiment, an apparatus is described which includes means for obtaining channel state information indicative of received signal quality for a wireless channel used for data transmission, means for determining the age of the channel state information, and means for selecting at least one rate for data transmission via the wireless channel based on the channel state information and the age of the channel state information.

According to yet another embodiment, a method is provided in which the age of channel information available for use to transmit data via a wireless channel is determined. A transmission mode is selected from among multiple transmission modes based on the age of the channel information. Channel state information indicative of received signal quality for the wireless channel is obtained. The age of the channel state information is determined. At least one rate is selected for data transmission based on the channel state information and the age of the channel state information. Data is transmitted via the wireless channel in accordance with the transmission mode and the at least one rate selected for data transmission.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The transmission mode and rate selection techniques described herein may be used for various wireless communication systems. These techniques may be used for single-carrier as well as multi-carrier systems. These techniques may also be used for time division duplex (TDD) as well as frequency division duplex (FDD) systems. For an FDD system, the downlink (or forward link) and uplink (or reverse link) are allocated different frequency bands, and the channel response for one link may not correlate well with the channel response for the other link. For a TDD system, the downlink and uplink share the same frequency band, and a high degree of correlation normally exists between the downlink and uplink channel responses. Pilot transmission, channel estimation, and spatial processing may be performed in a manner to take advantage of this correlation. For clarity, the transmission mode and rate selection is described below for an exemplary single-carrier TDD MIMO system. Also for clarity, station A is a transmitting entity and station B is a receiving entity for a data transmission from station A to station B. Each station may be an access point (which is also referred to as a base station) or a user terminal (which is also referred to as a mobile station, a user equipment, a wireless device, and so on).

The exemplary MIMO system supports multiple transmission modes for improved performance and greater flexibility. Each transmission mode may perform spatial processing (if at all) in a different manner and may or may not require channel information for spatial processing. Table 1 lists some exemplary transmission modes and their short descriptions.

TABLE 1

| Transmission Mode | Description |
| --- | --- |
| Steered mode | Multiple data streams are transmitted on multiple orthogonal spatial channels of a MIMO channel. |
| Unsteered mode | Multiple data streams are transmitted on multiple spatial channels of the MIMO channel. |

The steered mode uses channel information (e.g., eigenvectors) to transmit data on orthogonal spatial channels (or "eigenmodes") of a MIMO channel. The unsteered mode does not need any channel information to transmit data on spatial channels of the MIMO channel.

The MIMO system may employ spatial spreading for the unsteered mode to enhance performance. With spatial spreading, station A performs spatial processing with different steering matrices so that a data transmission observes an ensemble of effective channels and is not stuck on a single bad channel realization for an extended period of time. Consequently, performance is not dictated by the worst-case channel condition.

Each transmission mode has different capabilities and requirements. The steered mode can typically achieve better performance and may be used if station A has sufficient channel information to transmit data on orthogonal spatial channels. The unsteered mode does not require channel information, but performance may not be as good as the steered mode. A suitable transmission mode may be selected for use depending on the available channel information, the capabilities of stations A and B, system requirements, and so on.

For the steered mode, data is transmitted on $N_S$ eigenmodes of the MIMO channel formed by the $N_T$ transmit antennas at station A and the $N_R$ receive antennas at station B. The MIMO channel may be characterized by an $N_R \times N_T$ channel response matrix H, which may be "diagonalized" to obtain the $N_S$ eigenmodes of the MIMO channel. This diagonalization may be achieved by performing either singular value decomposition of H or eigenvalue decomposition of a correlation matrix of H, which is $R = H^H H$, where $H^H$ denotes the conjugate transpose of H. The singular value decomposition of H may be expressed as:

$$H = U \cdot \Sigma \cdot V^H, \quad \text{Eq(1)}$$

where U is an $N_R \times N_R$ unitary matrix of left eigenvectors of H; $\Sigma$ is an $N_R \times N_T$ diagonal matrix of singular values of H; and V is an $N_T \times N_T$ unitary matrix of right eigenvectors of H.

A unitary matrix M is characterized by the property $M^H M = I$, where I is the identity matrix. The columns of a unitary matrix are orthogonal to one another. The right eigenvectors in V may be used for spatial processing by station A to transmit data on the $N_S$ eigenmodes of H. The left eigenvectors in U may be used for receiver spatial processing by station B to recover the data transmitted on the $N_S$ eigenmodes. The diagonal matrix $\Sigma$ contains non-negative real values along the diagonal and zeros elsewhere. These diagonal entries are referred to as singular values of H and represent the channel gains for the $N_S$ eigenmodes. The diagonal elements of $\Sigma$ may be ordered from largest to smallest, and the columns of V and U may be ordered correspondingly, as described below. Singular value decomposition is described by Gilbert Strang in "Linear Algebra and Its Applications," Second Edition, Academic Press, 1980.

Station A performs spatial processing for the steered mode as follows:

$$x^s = V \cdot s, \quad \text{Eq (2)}$$

where s is a vector with up to $N_S$ data symbols to be sent on the $N_S$ eigenmodes; and
$x^s$ is a vector with $N_T$ transmit symbols to be sent from the $N_T$ transmit antennas.

As used herein, a "data symbol" is a modulation symbol for data, a "pilot symbol" is a modulation symbol for pilot (which is data that is known a priori by both stations A and B), a "transmit symbol" is a symbol to be sent from a transmit antenna, and a "received symbol" is a symbol obtained from a receive antenna.

The received symbols at station B may be expressed as:

$$r^s = H \cdot x^s + n = H \cdot V \cdot s + n = H_{eff}^s \cdot s + n, \quad \text{Eq (3)}$$

where $r^s$ is a vector with $N_R$ received symbols for the $N_R$ receive antennas;
$H_{eff}^s = H \cdot V$ is an effective MIMO channel response matrix observed by s for the steered mode; and
n is a noise vector.

For simplicity, the noise is assumed to be additive white Gaussian noise (AWGN) with a zero mean vector and a covariance matrix of $\phi_{nn} = \sigma_{noise}^2 \cdot I$, where $\sigma_{noise}^2$ is the variance of the noise. Station B may recover the data symbols in s using various receiver processing techniques.

Station B may perform full-CSI spatial processing for the steered mode as follows:

$$\hat{s}_{fcsi}^s = \Sigma^{-1} \cdot U^H \cdot r^s = \Sigma^{-1} \cdot U^H H \cdot x^s + n_{fcsi} = s + n_{fcsi}, \quad \text{Eq (4)}$$

where $\hat{s}_{fcsi}^s$ is a vector with up to $N_S$ "detected" data symbols, which are estimates of the up to $N_S$ data symbols in s; and
$n_{fcsi}$ is the noise after the receiver spatial processing.

Alternatively, station B may perform minimum mean square error (MMSE) spatial processing, as follows:

$$\hat{s}_{mmse}^s = D_{mmse}^s \cdot M_{mmse}^s \cdot r^s = D_{mmse}^s \cdot Q_{mmse}^s \cdot s + n_{mmse}^s, \quad \text{Eq (5)}$$

where $M_{mmse}^s = [H_{eff}^{sH} \cdot H_{eff}^s + \sigma_{noise}^2 \cdot I]^{-1} \cdot H_{eff}^{sH}$ is an MMSE spatial filter matrix;

$Q_{mmse}^s = M_{mmse}^s \cdot H_{eff}^s$;
$D_{mmse}^s = [\text{diag}[Q_{mmse}^s]]^{-1}$ is a diagonal matrix; and
$n_{mmse}^s$ is the MMSE filtered noise for the steered mode.

The spatial filter matrix $M_{mmse}^s$ minimizes the mean square error between the symbol estimates from the spatial filter and the data symbols in s. The symbol estimates from the spatial filter are unnormalized estimates of the data symbols. The multiplication with the scaling matrix $D_{mmse}^s$ provides normalized estimates of the data symbols.

For the unsteered mode with spatial spreading, station A performs spatial processing as follows:

$$x^u = V_{ss} \cdot s, \qquad \text{Eq (6)}$$

where $V_{ss}$ is an $N_T \times N_T$ steering matrix for spatial spreading; and
$x^u$ is a vector with $N_T$ transmit symbols for the unsteered mode.

With spatial spreading, each data symbol in s is spatially spread with a respective column of $V_{ss}$. The matrix $V_{ss}$ typically changes over time and/or frequency but is known by both stations A and B. Each transmit symbol in $x^u$ includes a component of each of the $N_S$ data symbols in s.

The received symbols at station B for the unsteered mode may be expressed as:

$$r^u = H \cdot x^u + n = H \cdot V_{ss} \cdot s + n = H_{eff}^u \cdot s + n, \qquad \text{Eq (7)}$$

where $r^u$ is a vector with $N_R$ received symbols for the $N_R$ receive antennas; and
$H_{eff}^u = H \cdot V_{ss}$ is an effective MIMO channel response matrix observed by s for the unsteered mode with spatial spreading.

Station B may perform channel correlation matrix inversion (CCMI) spatial processing, which is also commonly referred to as a zero-forcing, as follows:

$$\hat{s}_{ccmi}^u = M_{ccmi}^u \cdot r^u = s + n_{ccmi}^u, \qquad \text{Eq (8)}$$

where $M_{ccmi}^u = [H_{eff}^{uH} \cdot H_{eff}^u]^{-1} \cdot H_{eff}^{uH}$ is a CCMI spatial filter matrix; and
$n_{ccmi}^u$ is the CCMI filtered noise for the unsteered mode.

Alternatively, station B may perform MMSE spatial processing as follows:

$$\hat{s}_{mmse}^u = D_{mmse}^u \cdot M_{mmse}^u \cdot r^u = D_{mmse}^u \cdot Q_{mmse}^u \cdot s + n_{mmse}^u, \qquad \text{Eq (9)}$$

where $M_{mmse}^u = [H_{eff}^{uH} \cdot H_{eff}^u + \sigma_{noise}^2 \cdot I]^{-1} \cdot H_{eff}^{uH}$ is an MMSE spatial filter matrix;
$Q_{mmse}^u = M_{mmse}^u \cdot H_{eff}^u$;
$D_{mmse}^u = [\text{diag}[Q_{mmse}^u]]^{-1}$; and
$n_{mmse}^u$ is the MMSE filtered noise for the unsteered mode.

As shown in equations (5) and (8), station B may perform MMSE spatial processing for both the steered and unsteered modes. However, different matrices $H_{eff}^s$ and $H_{eff}^u$ are used for the steered and unsteered modes, respectively.

If spatial spreading is not used for the unsteered mode, then the transmit vector may be expressed as: $x^u = s$. Station B may recover the data symbols in s using CCMI or MMSE receiver spatial processing. However, the spatial filter matrix would be derived based on H instead of $H_{eff}^u$.

Station A performs spatial processing with V for the steered mode. Station B performs spatial matched filtering with U (or with H and V) for the steered mode and with H and $V_{ss}$ for the unsteered mode. An estimate of H may be obtained by one station based on an "unsteered MIMO" pilot sent by the other station. An unsteered MIMO pilot is a pilot comprised of N pilot transmissions sent from N transmit antennas, where the pilot transmission from each transmit antenna is identifiable by the receiving entity, $N=N_T$ if the unsteered MIMO pilot is sent by station A, and $N=N_R$ if the unsteered MIMO pilot is sent by station B. This may be achieved, for example, by using a different orthogonal sequence for the pilot transmission from each transmit antenna and/or sending the pilot transmission for each transmit antenna on a different frequency subband. The unsteered MIMO pilot may be expressed as:

$$x_{pilot}^u(i) = w(i) \cdot p(i), \qquad \text{Eq (10)}$$

where $p(i)$ is a pilot symbol to be transmitted in symbol period i;
$w(i)$ is a vector with N chips for the N transmit antennas for symbol period i; and
$x_{pilot}^u(i)$ is a transmit vector for the unsteered MIMO pilot for symbol period i.

For example, if $N=4$, then four Walsh vectors $w(0)=[1\ 1\ 1\ 1]^T$, $w(1)=[1\ -1\ 1\ -1]^T$, $w(2)=[1\ 1\ -1\ -1]^T$, and $w(3)=[1\ -1\ -1\ 1]^T$ may be used for four symbol periods, where "$T$" denotes a transpose. A complete unsteered MIMO pilot may be sent in N (consecutive or non-consecutive) symbol periods, or one symbol period for each chip of the orthogonal sequence. Upon receiving the complete unsteered MIMO pilot, the receiving entity can perform the complementary processing on the received pilot to estimate H. For simplicity, the following description assumes no error in channel estimation.

For a TDD system, the downlink and uplink channel responses may be assumed to be reciprocal of one another. That is, if H represents a channel response matrix from antenna array X to antenna array Y, then a reciprocal channel implies that the coupling from array Y to array X is given by $H^T$. However, the responses of the transmit and receive chains at station A are typically different from the responses of the transmit and receive chains at station B. Calibration may be performed to derive correction matrices that can account for the difference in the responses of the transmit and receive chains at the two stations. The application of the correction matrices at these two stations allows a calibrated channel response for one link to be expressed as a transpose of a calibrated channel response for the other link. For simplicity, the following description assumes a flat frequency response for the transmit and receive chains, $H_{ab}=H$ is the channel response matrix for the link from station A to station B, and $H_{ba}=H^T$ is the channel response matrix for the link from station B to station A.

The singular value decomposition of $H_{ab}$ and $H_{ba}$ may be expressed as:

$$H_{ab} = U \cdot \Sigma \cdot V^H \text{ and } H_{ba} = V^* \cdot \Sigma^T \cdot U^T, \qquad \text{Eq (11)}$$

where $V^*$ is a complex conjugate of V. As shown in equation (11), U and V are matrices of left and right eigenvectors of $H_{ab}$, and $V^*$ and $U^*$ are matrices of left and right eigenvectors of $H_{ba}$. Stations A and B may use the matrices V and $U^*$, respectively, for spatial processing to transmit data for the steered mode.

Because of the reciprocal channel, one station may perform the singular value decomposition to obtain either V or $U^*$. This station may then transmit a "steered MIMO" pilot, which is a pilot sent on the eigenmodes of the MIMO channel. The other station may then estimate its matrix of eigenvectors based on the steered MIMO pilot.

Station A may transmit a steered MIMO pilot as follows:

$$x_{pilot,m}^s = v_m \cdot p_m, \qquad \text{Eq (12)}$$

where $v_m$ is the m-th eigenvector/column of V;
$p_m$ is a pilot symbol to be transmitted on the m-th eigenmode of $H_{ab}$; and $x_{pilot,m}^s$ is a transmit vector for the steered MIMO pilot for the m-th eigenmode.

The received steered MIMO pilot at station B may be expressed as:

$$r_{pilot,m}^s = H_{ab} \cdot x_{pilot,m}^s + n = U \cdot \Sigma \cdot V^H \cdot v_m \cdot p_m + n = u_m \cdot \sigma_m \cdot p_m + n, \qquad \text{Eq (13)}$$

where $r_{pilot}^s$ is the received vector for the steered MIMO pilot for the m-th eigenmode;

$\sigma_m$ is the m-th diagonal element of $\Sigma$; and $u_m$ is the m-th eigenvector/column of U.

Equation (13) indicates that station B may obtain an estimate of U, one column at a time, based on a steered MIMO pilot sent by station A. Station A may send a complete steered MIMO pilot on all $N_S$ eigenmodes in one or more (consecutive or non-consecutive) symbol periods. Station B may also transmit a steered MIMO pilot to station A in similar manner using the columns of U*.

Pilot and data may be transmitted in various manners in the MIMO system. For the steered mode, station A uses channel information (or "eigensteering" information) to transmit data on the eigenmodes of the MIMO channel. The channel information may be in the form of H (which may be obtained from an unsteered MIMO pilot sent by station B) or in the form of U or V (which may be obtained from a steered MIMO pilot sent by station B). Station B also uses channel information (e.g., H, U, or V for the steered mode, and H for the unsteered mode) to recover a data transmission from station A. For both modes, station B may estimate the received SNRs for the spatial channels, determine the rate(s) supported by the received SNRs, and send either the received SNRs or the supported rate(s) to station A. Station A may then select a suitable transmission mode and suitable rate(s) for data transmission to station B based on the received feedback and possibly other information. For clarity, the rates selected by station B are referred to as the initial rates, and the rates selected by station A are referred to as the final rates. Also for clarity, the following description assumes that station B sends rate information (instead of SNR information) back to station A.

Figure 1A:
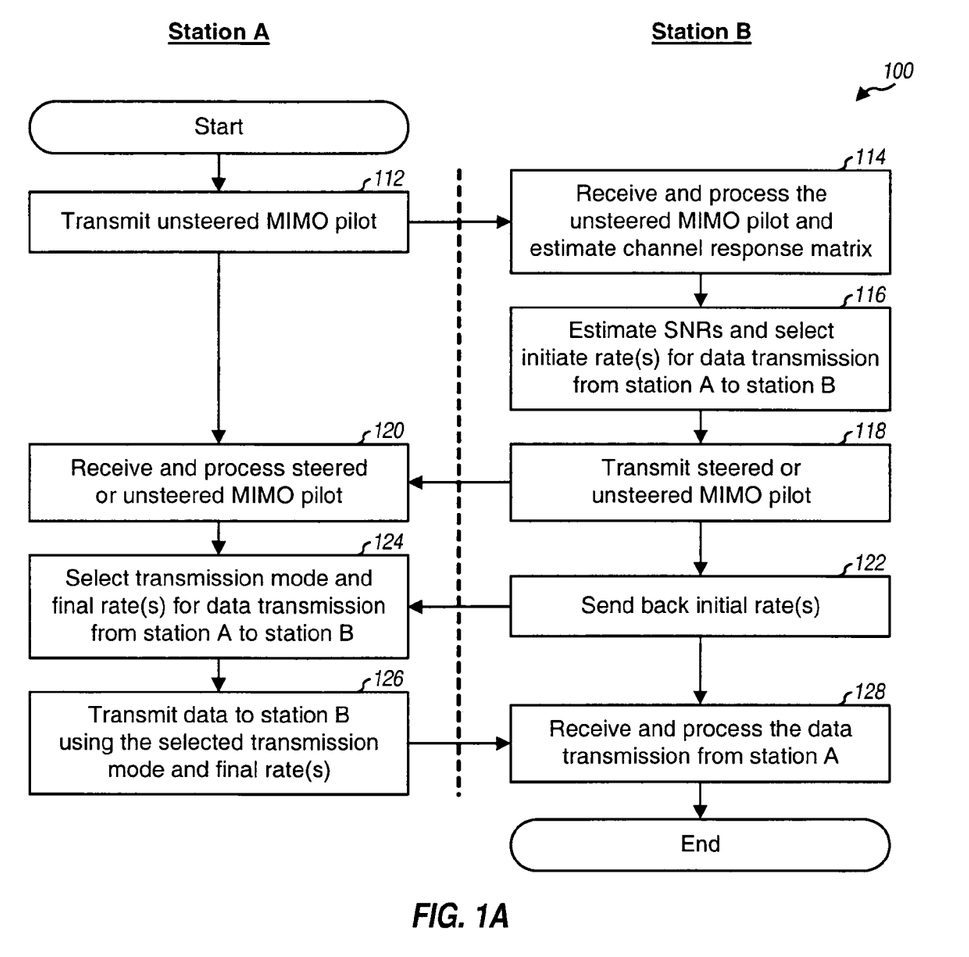
FIGS. 1A and 1B show two exemplary pilot and data transmission schemes.

FIG. 1A shows an exemplary pilot and data transmission scheme 100 for the MIMO system. Initially, station A transmits an unsteered MIMO pilot (block 112). Station B receives and processes the unsteered MIMO pilot and obtains an estimate of the channel response matrix H (block 114). Station B also estimates the received SNRs for the (orthogonal or non-orthogonal) spatial channels of the MIMO channel based on the received pilot (block 116). Station B also determines either an initial rate for each eigenmode (for the steered mode) or a single initial rate for the MIMO channel (for the unsteered mode) based on the received SNRs (also block 116). The initial rate(s) are applicable for a data transmission from station A to station B.

Station B transmits either an unsteered MIMO pilot or a steered MIMO pilot using the eigenvectors derived from H (block 118). Station A receives and processes the steered or unsteered MIMO pilot to obtain a channel estimate for the link from station A to station B (block 120). Station B also sends the initial rate(s) to station A (block 122). Station A receives the initial rate(s) and determines a transmission mode and final rate(s) to use for data transmission to station B, as described below (block 124). Station A then transmits data to station B using the selected transmission mode and final rate(s) (block 126). Station B receives and processes the data transmission from station A (block 128).

Figure 1B:
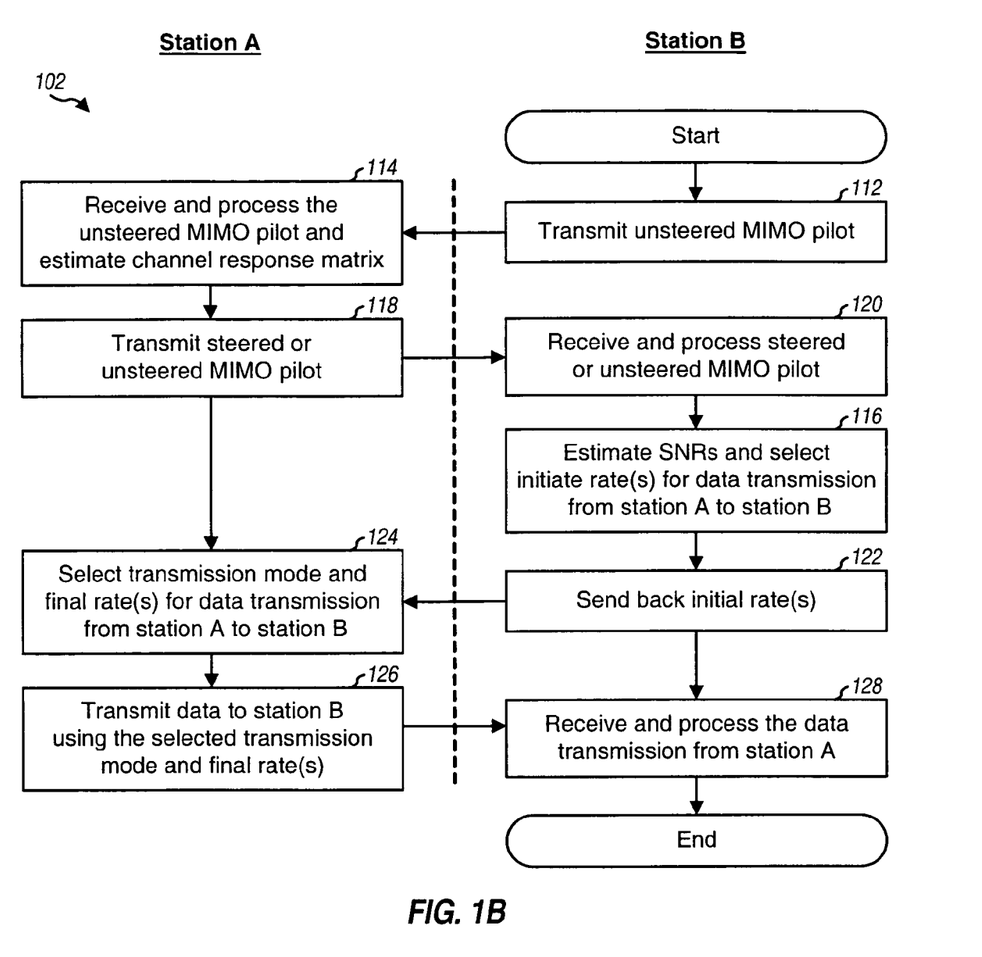

FIG. 1B shows another exemplary pilot and data transmission scheme 102 for the MIMO system. Initially, station B transmits an unsteered MIMO pilot (block 112). Station A receives and processes the unsteered MIMO pilot and obtains an estimate of the channel response matrix H (block 114). Station A then transmits either an unsteered MIMO pilot or a steered MIMO pilot using the eigenvectors derived from H (block 118). Station B receives and processes the steered or unsteered MIMO pilot to obtain a channel estimate for the link from station A to station B (block 120). The remaining processing for blocks 116, 122, 124, 126 and 128 are as described above for FIG. 1A.

As shown in FIGS. 1A and 1B, pilots may be transmitted in various manners to allow both stations A and B to obtain a channel estimate for the link from station A to station B. Both stations may transmit an unsteered MIMO pilot. Alternatively, one station may transmit an unsteered MIMO pilot, and the other station may transmit a steered MIMO pilot. In this case, either station A or B may transmit the unsteered MIMO pilot, as shown in FIGS. 1A and 1B.

Figure 2:
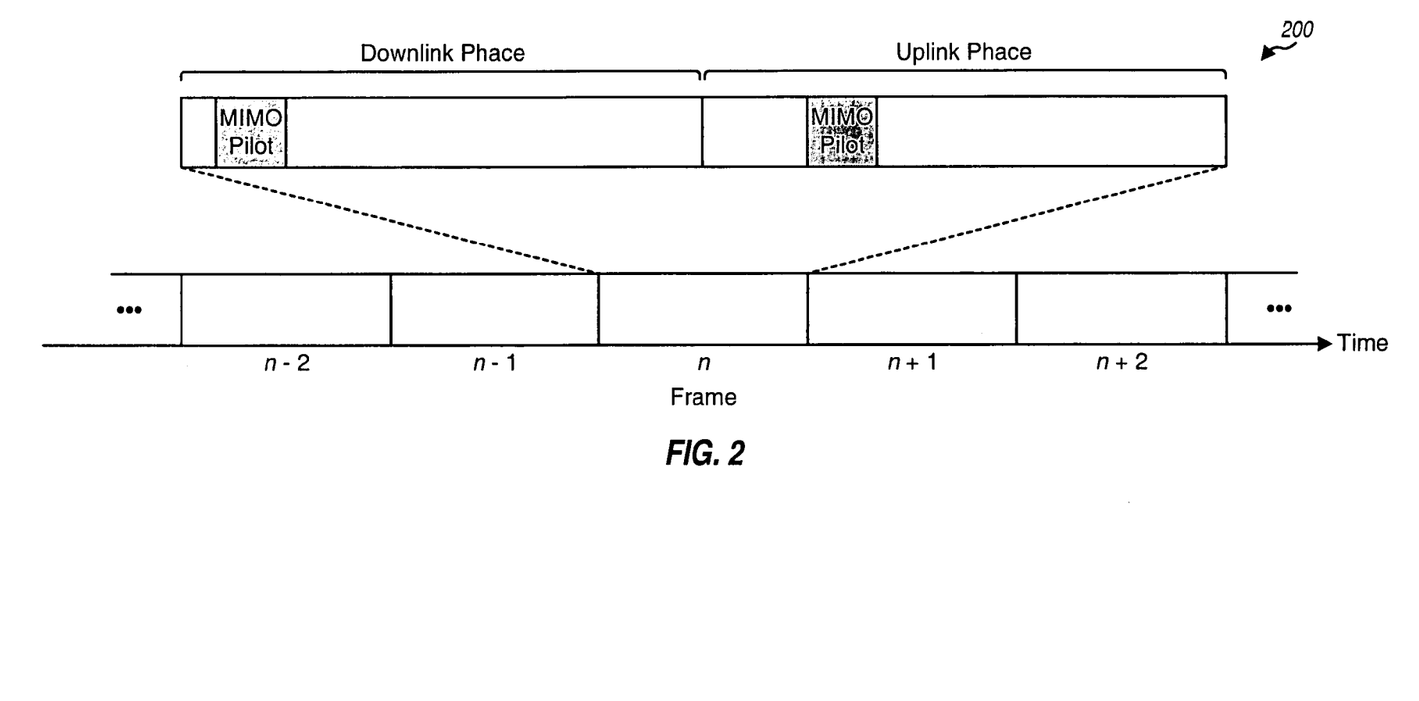
FIG. 2 shows a frame structure that may be used for the MIMO system.

FIG. 2 shows an exemplary frame structure 200 that may be used for the MIMO system. Data transmission occurs in units of frames, with each frame spanning a particular time duration (e.g., 2 msec). Each frame may be partitioned into (1) a downlink phase during which data and pilot may be sent on the downlink and (2) an uplink phase during which data and pilot may be sent on the uplink. For each frame, a MIMO pilot may or may not be sent on the downlink, and a MIMO pilot may or may not be sent on the uplink.

Station B may estimate the received SNRs for the spatial channels based on a steered or unsteered MIMO pilot received from station A. The received SNR is dependent on the spatial processing performed by both stations A and B.

For the steered mode with full-CSI receiver spatial processing, the SNR of each eigenmode may be expressed as:

$$SNR_{fcsi,m}(n) = 10 \log_{10}\left(\frac{P_m(n) \cdot \sigma_m^2(n)}{\sigma_{noise}^2}\right), \qquad \text{Eq (14)}$$

for $i = 1, \ldots, N_S$, where $P_m(n)$ is the transmit power used for the m-th eigenmode in frame n;

$\sigma_m$ is the m-th diagonal element of $\Sigma(n)$ for frame n; and $SNR_{fcsi,m}(n)$ is the SNR of the m-th eigenmode in frame n.

The $N_S$ eigenmodes may achieve different SNRs. Consequently, different rates may be used for the data streams sent on these eigenmodes.

For the steered and unsteered modes with MMSE receiver spatial processing, the SNR of each spatial channel may be expressed as:

$$SNR_{mmse,m}(n) = 10 \log_{10}\left(\frac{q_m(n)}{1 - q_m(n)} P_m(n)\right), \qquad \text{Eq (15)}$$

for $i = 1, \ldots, N_S$, where $q_m(n)$ is the m-th diagonal element of $Q_{mmse}^s$ or $Q_{mmse}^u$ for frame n; and $SNR_{mmse,m}(n)$ is the SNR of the m-th spatial channel in frame n.

For the unsteered mode with CCMI receiver spatial processing, the SNR of each spatial channel may be expressed as:

$$SNR_{ccmi,m}(n) = 10\log_{10}\left(\frac{P_m(n)}{r_m(n)\cdot\sigma_{noise}^2}\right), \quad \text{Eq (16)}$$

for $i = 1, \ldots, N_S$, where $r_m(n)$ is the m-th diagonal element of $[R_{\text{eff}}^u]^{-1}$ and $R_{\text{eff}}^u = H_{\text{eff}}^{u\,H} \cdot H_{\text{eff}}^u$ for frame n; and $SNR_{ccmi,\,m}(n)$ is the SNR of the m-th spatial channel in frame n.

In the above equations, the quantity $P_m(n)/\sigma_{noie}^2$ is the SNR (in linear units) prior to the receiver spatial processing. The quantities $SNR_{fcsi,\,m}(n)$, $SNR_{mmse,\,m}(n)$, and $SNR_{ccmi,\,m}(n)$ are the SNRs (in units of decibel (dB)) after the receiver spatial processing and are also referred to as the received SNRs. In the following description, "SNR" refers to received SNR unless noted otherwise.

For the unsteered mode with spatial spreading, the $N_S$ spatial channels achieve similar SNRs because of the spatial spreading with the matrix $V_{ss}$. Consequently, the same rate may be used for all of the data streams sent on these spatial channels. With spatial spreading, each data symbol is transmitted on all $N_S$ spatial channels and observes an average SNR for all spatial channels, which may be expressed as:

$$SNR_{mmse}(n) = 10\log_{10}\left(\sum_{m=1}^{N_S}\frac{q_m(n)}{1-q_m(n)}P_m(n)\right), \text{ and} \quad \text{Eq (17)}$$

$$SNR_{ccmi}(n) = 10\log_{10}\left(\sum_{m=1}^{N_S}\frac{P_m(n)}{r_m(n)\cdot\sigma_{noise}^2}\right). \quad \text{Eq (18)}$$

The SNR averaging may be done in linear unit, as shown in equations (17) and (18), or in dB.

For the steered mode, station B may determine an initial rate for each eigenmode based on its $SNR_m(n)$, which may be equal to $SNR_{fcsi,\,m}(n)$ computed as shown in equation (14) or equal to $SNR_{mmse,\,m}(n)$ computed as shown in equation (15). The MIMO system may support a set of rates, and each rate may be associated with a particular data rate, a particular coding scheme, a particular modulation scheme, and a particular minimum SNR required to achieve a specified desired level of performance (e.g., 1% packet error rate). The required SNR for each non-zero rate may be obtained by computer simulation, empirical measurements, and so on. The set of supported rates and their required SNRs may be stored in a look-up table. The $SNR_m(n)$ for each eigenmode may be provided to the look-up table, which then returns a rate $R_m(n)$ supported by that SNR. The rate $R_m(n)$ is associated with the highest data rate and a required SNR that is less than or equal to $SNR_m(n)$, or $SNR_{req}(R_m(n)) \leq SNR_m(n)$.

For the unsteered mode, station B may determine an initial rate for the MIMO channel based on SNR(n), which may be equal to $SNR_{mmse}(n)$ computed as shown in equation (17) or equal to $SNR_{ccmi}(n)$ computed as shown in equation (18). The SNR(n) may be provided to a look-up table, which then returns a rate R(n) supported by the MIMO channel for the unsteered mode for that SNR. The same or different look-up tables may be used for the steered and unsteered modes.

Station B may make an initial determination as to the transmission mode and rate(s) to use for a data transmission from station A to station B. Station A may make a final determination as to the transmission mode and rate(s) to use for this data transmission based on feedback received from station B and other pertinent information.

Station A may select which transmission mode to use for data transmission based on the age of the channel information available in the current frame and possibly other information regarding the MIMO channel. The characteristic of the MIMO channel may vary over time due to a number of factors such as, for example, fading, multipath, and interference. For a time variant system, the accuracy/reliability of the channel information degrades over time. Poor performance may be obtained by using inaccurate/unreliable channel information for data transmission. Since the channel information is derived from a MIMO pilot, the age of the channel information may be determined based on the age of the MIMO pilot used to derive the channel information. The age of the MIMO pilot may be determined as described below.

A MIMO pilot may be transmitted in each frame, or periodically in every few frames, or sporadically. Station A may derive an estimate of H based on an unsteered MIMO pilot received from station B and may decompose H to obtain the matrix V of eigenvectors used to transmit data on the eigenmodes of the MIMO channel. Station A may also obtain the eigenvectors directly from a steered MIMO pilot received from station B. However, this steered MIMO pilot is transmitted by station B using eigenvectors in U. which are derived from an estimate of H obtained by station B from an unsteered MIMO pilot sent by station A. Thus, the eigenvectors in V obtained by station A from the steered MIMO pilot sent by station B are, in effect, derived from the unsteered MIMO pilot sent by station A. The quality of the eigenvectors in V derived from the steered MIMO pilot received from station B is thus dependent on (and is only as good as) the quality of the corresponding unsteered MIMO pilot sent by station A, from which H and U are derived.

Station A may keep track of when MIMO pilots are transmitted to and received from station B. For example, station A may keep a record of (1) the time each unsteered MIMO pilot is transmitted, (2) the time each steered MIMO pilot is transmitted, (3) the time each unsteered MIMO pilot is received, and (4) the time each steered MIMO pilot is received. This record may be maintained in various formats. For example, the record may contain, for each frame n, four time entries for the four MIMO pilot events. If a MIMO pilot was not transmitted or received in a given frame n, then the time entry for that MIMO pilot for a prior frame n−1 may be copied and stored for frame n. With this record format, in any given frame n, station A may readily determine (1) the time that the latest (or most recent) unsteered MIMO pilot was transmitted, which is denoted as $t_{tx}^u(A \rightarrow B, n)$, (2) the time the latest steered MIMO pilot was transmitted, which is denoted as $t_{tx}^s(A \rightarrow B, n)$, (3) the time the latest unsteered MIMO pilot was received, which is denoted as $t_{rx}^u(A \leftarrow B, n)$, and (4) the time the latest steered MIMO pilot was received, which is denoted as $t_{rx}^u(A \leftarrow B, n)$. Station A may use this information to determine the age and quality of the channel information that is currently available.

Table 2 shows a list of variables used in the description below.

TABLE 2

| Symbol | Description |
| --- | --- |
| $t_{tx}^u(A \rightarrow B, n)$ | The latest time that station A transmits an unsteered MIMO pilot to station B, as determined in frame n. |
| $t_{tx}^s(A \rightarrow B, n)$ | The latest time that station A transmits a steered MIMO pilot to station B, as determined in frame n. |

TABLE 2-continued

| Symbol | Description |
| --- | --- |
| $t_{rx}^u(A \leftarrow B, n)$ | The time at which station A receives the latest unsteered MIMO pilot from station B, as determined in frame n. |
| $t_{rx}^s(A \leftarrow B, n)$ | The time at which station A receives the latest steered MIMO pilot from station B, as determined in frame n. |
| $d_{pilot}^u$ | Processing delay for an unsteered MIMO pilot to obtain channel information. |
| $d_{pilot}^s$ | Processing delay for a steered MIMO pilot to obtain channel information. |
| $d_{snr}$ | Processing delay for a MIMO pilot to obtain SNR/rate information. |
| $Th_{age}^{steer}$ | Maximum age to permit use of the channel information. |
| $Th_{age}^{rate}$ | Maximum age to permit use of the SNR/rate information. |
| $SNR(A \leftarrow B, n)$ | Set of SNRs obtained by station A from station B (e.g., derived from initial rate(s) received from station B). |
| $t_{snr}(A \leftarrow B, n)$ | The time at which $SNR(A \leftarrow B, n)$ was obtained by station A. |

Station A may determine the age of the channel information available in the current frame n (or the "current channel information") as follows. If the current channel information is derived from an unsteered MIMO pilot received from station B, then the age of this information is equal to the age of the unsteered MIMO pilot. However, a delay of $d_{pilot}^u$ is incurred to process the unsteered MIMO pilot to obtain the channel information or, equivalently, the channel information is available $d_{pilot}^u$ seconds after receiving the unsteered MIMO pilot. Thus, the latest unsteered MIMO pilot that could have been used to derive the current channel information was received at least $d_{pilot}^u$ seconds earlier and may be identified as follows:

$$\max_i \{[t_{current} - t_{rx}^u(A \leftarrow B, i)] \geq d_{pilot}^u\}. \quad \text{Eq (19)}$$

If the latest unsteered MIMO pilot for the current frame n was received at least $d_{pilot}^u$ seconds earlier, then this unsteered MIMO pilot was used to derive the current channel information. However, if the latest unsteered MIMO pilot for the current frame n was received less than $d_{pilot}^u$ seconds earlier, then this unsteered MIMO pilot was not used to derive the current channel information. Equation (19) determines the most recent frame i in which the latest unsteered MIMO pilot for that frame i could have been used to derive the current channel information. The age of the current channel information derived from the unsteered MIMO pilot may then be expressed as:

$$\text{Age}^u = t_{current} - t_{rx}^u(A \leftarrow B, i), \quad \text{Eq (20)}$$

where i is the frame index determined by equation (19); and

Age$^u = -\infty$ if an unsteered MIMO pilot was not received.

If the current channel information is derived from a steered MIMO pilot received from station B, then the age of this information is equal to the age of the corresponding unsteered MIMO pilot from which the steered MIMO pilot is derived. A delay of $d_{pilot}^s$ is incurred by station A to process the steered MIMO pilot received from station B, and a delay of $d_{pilot}^u$ is incurred by station B to process the corresponding unsteered MIMO pilot sent by station A. Thus, the latest unsteered MIMO pilot that could have been used to derive the current channel information was received at least $d_{pilot}^s + d_{pilot}^u$ seconds earlier and may be identified as follows:

$$\max_i \{[t_{current} - t_{rx}^s(A \leftarrow B, i)] \geq d_{pilot}^s\} \text{ AND} \quad \text{Eq (21)}$$

$$\max_j \{[t_{rx}^s(A \leftarrow B, i) - t_{tx}^u(A \rightarrow B, j)] \geq d_{pilot}^u\}.$$

Equation (21) determines the most recent frame j in which the latest unsteered MIMO pilot for that frame j could have been used to derive the current channel information. The age of the current channel information derived from the steered MIMO pilot may then be expressed as:

$$\text{Age}^s = t_{current} - t_{tx}^u(A \rightarrow B, j), \quad \text{Eq (22)}$$

where j is the frame index determined by equation (21); and

Age$^s = -\infty$ if a steered MIMO pilot was not received.

The age of the current channel information, $\text{Age}_{ch\_inf}(n)$, may then be expressed as:

$$\text{Age}_{ch\_inf}(n) = \min(\text{Age}^u, \text{Age}^s). \quad \text{Eq (23)}$$

A transmission mode may then be selected based on the age of the current channel information, as follows:

$$\text{Transmission mode} = \quad \text{Eq (24)}$$
$$\begin{cases} \text{Steered mode} & \text{if } \text{Age}_{ch\_inf}(n) \leq Th_{age}^{steer}, \\ \text{Unsteered mode} & \text{if } \text{Age}_{ch\_inf}(n) > Th_{age}^{steer}. \end{cases}$$

The transmission mode may also be selected based on other pertinent information. For example, the time variant nature of the MIMO channel may be considered. If the MIMO channel is relatively static (e.g., for fixed stations A and B), then the channel information may be relatively accurate and valid over a longer time period. Conversely, if the MIMO channel changes fairly rapidly (e.g., for mobile stations A and/or B), then the channel information may be accurate over a shorter time period. The time variant nature of the MIMO channel may be accounted for in the computation of the age of the channel information and/or in the age threshold, $Th_{age}^{steer}$. For example, Age$^u$ and Age$_s$ may be a function of channel type (e.g., fast or slow fading), different age thresholds may be used for different channel types, and so on.

Station A may select the final rate(s) for data transmission to station B based on the age of the underlying MIMO pilot used to derive the initial rate(s). The actual rate(s) supported by the link from stations A to B are dependent on the received SNRs at station B, which may be estimated based on either a steered MIMO pilot or an unsteered MIMO pilot received from station A. The received SNRs may be converted to initial rate(s), which may then be sent back to station A. Station A may estimate the received SNRs at station B based on the initial rate(s) obtained from station B. For example, station A may provide each initial rate to an inverse look-up table, which may then provide the required SNR for the initial rate. The set of SNRs available to station A in the current frame n (or the "current SNR information") is denoted as $SNR(A \leftarrow B, n)$ and is obtained at time $t_{snr}(A \leftarrow B, n)$.

A delay of $d_{snr}$ is incurred in order (1) for station B to process a steered or unsteered MIMO pilot to estimate the received SNRs, derive the initial rate(s), and send the initial rate(s) back to station A and (2) for station A to process the initial rate(s) to obtain the current SNR information. Thus, the latest MIMO pilot that could have been used to obtain the current SNR information was sent by station A at least $d_{snr}$ seconds earlier and may be identified as follows:

$$\left[t_{snr}(A \leftarrow B, n) - \max_{k}\{t_{tx}^{u}(A \rightarrow B, k), t_{tx}^{s}(A \rightarrow B, k)\}\right] \geq d_{snr}. \quad \text{Eq (25)}$$

Equation (25) determines the most recent frame k in which the latest steered or unsteered MIMO pilot for that frame k could have been used to derive the current SNR information. The age of the current SNR information may then be expressed as:

$$\text{Age}_{snr\_inf}(n) = t_{current} - \max\{t_{tx}^{u}(A \rightarrow B, k), t_{tx}^{s}(A \rightarrow B, k)\}, \quad \text{Eq (26)}$$

where k is the frame index determined by equation (25).

The final rate(s) may be selected based on the current SNR information, the age of the SNR information, and possibly other information. For example, if the age of the current SNR information exceeds an SNR age threshold (or $\text{Age}_{snr\_inf}(n) > \text{Th}_{age}^{snr}$), then the SNR information may be deemed to be too stale and discarded from use. In this case, the most robust transmission mode and the lowest rate (e.g., the lowest rate in the unsteered mode) may be used for data transmission to station B. If the age of the current SNR information is less than the SNR age threshold, then the SNRs obtained by station A may be adjusted based on the age of the SNR information, and the adjusted SNRs may then be used to select the final rate(s). The SNR adjustment may be performed in various manners.

If the steered mode is selected for use, then station A may receive an initial rate for each eigenmode m, determine the required SNR for each eigenmode based on the initial rate for that eigenmode, and adjust the required SNR for each eigenmode based on the age of the SNR information. For example, an SNR back-off, $\text{SNR}_{age\_bo}(n)$, may be computed based on a linear function of age, as follows:

$$SNR_{age\_bo}(n) = \frac{SNR_{adj\_rate}}{Age_{snr\_inf}(n)}, \quad \text{Eq (27)}$$

where $\text{SNR}_{adj\_rate}$ is the rate of adjustment for the SNR (e.g., $\text{SNR}_{adj\_rate} = 50$ dB/sec).

The adjusted SNR for each eigenmode may then be computed as:

$$SNR_{adj,m}^{s}(n) = SNR_{req,m}(n) - SNR_{age\_bo}(n) - SNR_{bo}^{s}, \quad \text{Eq (28)}$$

where $\text{SNR}_{req,m}(n)$ is the required SNR for eigenmode m (obtained from the initial rate);

$\text{SNR}_{bo}^{s}$ is a back-off for the steered mode (e.g., $\text{SNR}_{bo}^{s} = 0$ dB); and $\text{SNR}_{adj,m}^{s}(n)$ is the adjusted SNR for eigenmode m for the steered mode.

Station A may provide the adjusted SNR for each eigenmode to a look-up table, which then provides the final rate for that eigenmode. Station A may use the same look-up table that station B used to obtain the initial rate for each eigenmode, or a different look-up table.

If the unsteered mode is selected for use, then station A may receive an initial rate for each eigenmode and may determine a single final rate for data transmission in the unsteered mode.

An adjusted SNR may be computed for each eigenmode as follows:

$$SNR_{adj,m}^{u}(n) = SNR_{req,m}(n) - SNR_{age\_bo}(n) - SNR_{bo}^{u}, \quad \text{Eq (29)}$$

where $\text{SNR}_{bo}^{u}$ is a back-off for the unsteered mode (e.g., $\text{SNR}_{bo}^{u} = 3$ dB); and $\text{SNR}_{adj,m}^{u}(n)$ is the adjusted SNR for eigenmode m for the unsteered mode.

$\text{SNR}_{bo}^{u}$ may be used to account for various factors such as, e.g., the total transmit power being distributed over all $N_S$ spatial channels (even the poor ones), loss in performance due to variation in SNR across each data packet, and so on. $\text{SNR}_{bo}^{u}$, $\text{SNR}_{bo}^{s}$, and $\text{SNR}_{adj\_rate}$ may be determined by computer simulation, empirical measurements, and so on.

The number of spatial channels to use for data transmission in the current frame n, $N_{sch}(n)$, may be determined by counting the number of "good" eigenmodes with adjusted SNRs greater than an SNR threshold, $\text{SNR}_{th}$. For each eigenmode m, if $\text{SNR}_{adj,m}^{u}(n) \geq \text{SNR}_{th}$, then eigenmode m is counted for $N_{sch}(n)$. The number of spatial channels to use for the unsteered mode is thus less than or equal to the number of eigenmodes, or $N_{sch}(n) \leq N_S$. An average SNR for the unsteered mode, $\text{SNR}_{avg}(n)$, may be computed as follows:

$$SNR_{avg}(n) = 10 \log_{10}\left(\frac{N_S}{N_{sch}(n)}\right) + \frac{1}{N_{sch}(n)} \cdot \sum_{m=1}^{N_S} SNR_{adj,m}^{u}(n). \quad \text{Eq (30)}$$

Station B selects the initial rate for each eigenmode based on an assumption that all $N_S$ eigenmodes are used for data transmission and that equal transmit power is used for all eigenmodes. If less than $N_S$ spatial channels are used for the unsteered mode, then higher transmit power may be used for each selected spatial channel. The first term on the right hand side in equation (30) accounts for the use of higher transmit power for each spatial channel if less than $N_S$ spatial channels are selected for use. The second term on the right hand side in equation (30) is the average SNR (in dB) for the $N_{sch}(n)$ spatial channels selected for use in frame n.

Station A may provide the average SNR to a look-up table, which then provides the final rate for the unsteered mode. Station A may use the same look-up table that station B used to obtain an initial rate for the unsteered mode, or a different look-up table.

Alternatively, station A may receive a single initial rate for the unsteered mode from station B. In this case, station A may determine the required SNR for the unsteered mode based on the initial rate, adjust the required SNR based on the age of the SNR information, and determine the final rate for the unsteered mode based on the adjusted SNR.

For both the steered and unsteered modes, the final rate(s) may also be determined based on other pertinent information such as the time variant nature of the MIMO channel. For example, the SNR back-off, $\text{SNR}_{age\_bo}(n)$, and/or the age threshold, $\text{Th}_{age}^{rate}$, may be a function of channel type (e.g., fast or slow fading). For simplicity, the SNR back-off was computed based on a linear function of age, as shown in equation (27). In general, the SNR back-off may be any linear or non-linear function of age and/or other parameters.

Figures 3, 4:
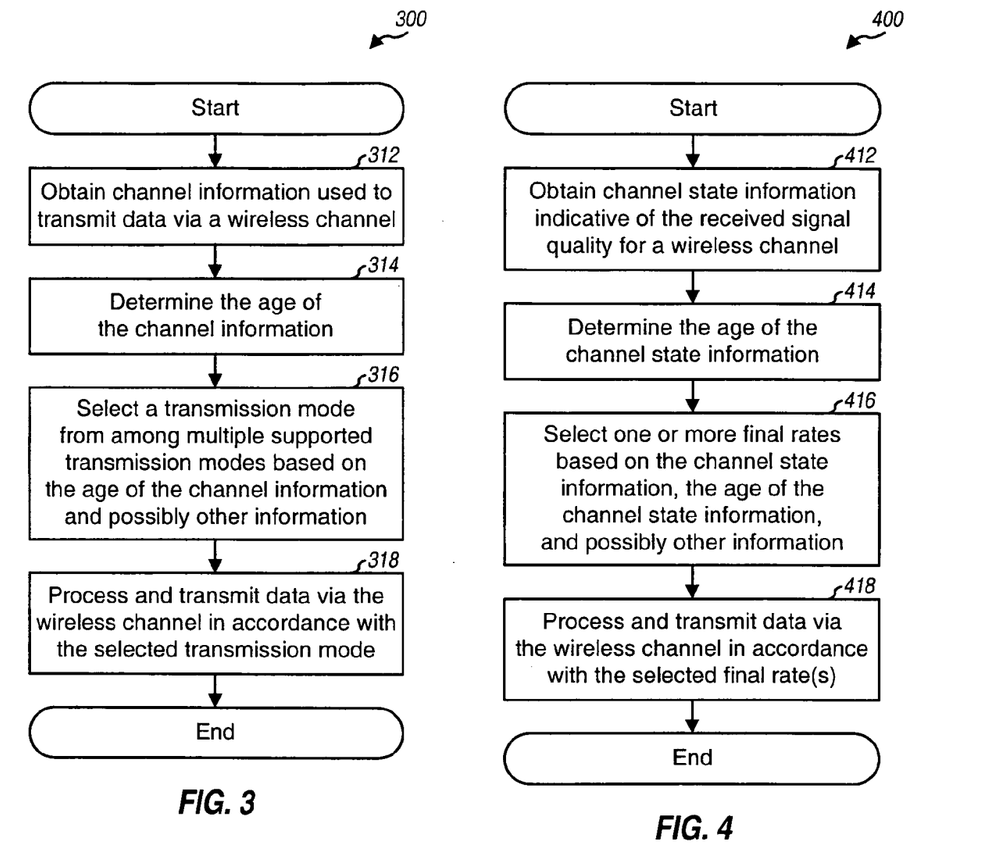
FIG. 3 shows a process for selecting a transmission mode for data transmission.
FIG. 4 shows a process for selecting rate(s) for data transmission.

FIG. 3 shows a flow diagram of a process 300 for selecting a transmission mode for data transmission in a wireless system. Initially, channel information used to transmit data via a wireless channel is obtained (block 312). For a MIMO system, the channel information may comprise eigenvectors used to transmit data on eigenmodes of a MIMO channel and may be obtained from a steered or unsteered MIMO pilot. The age of the channel information is determined (block 314). This may be achieved by determining the age of the (e.g., unsteered MIMO) pilot from which the channel information is derived. A transmission mode is then selected from among multiple supported transmission modes based on the age of the channel information and possibly other information (e.g., the time variant characteristic of the MIMO channel, the capability of the receiving entity, and so on) (block 316). Data is then processed and transmitted via the wireless channel in accordance with the selected transmission mode (block 318).

For clarity, the description above is for an exemplary MIMO system that supports two transmission modes—the steered mode and unsteered mode. In general, the system may support any transmission mode and any number of transmission modes. For example, a system may support a transmission mode in which data is transmitted on orthogonal spatial channels with spatial spreading, a transmission mode in which data is transmitted on orthogonal spatial channels without spatial spreading (the steered mode), a transmission mode in which data is transmitted on spatial channels with spatial spreading (the unsteered mode), a transmission mode in which data is transmitted on spatial channels without spatial spreading, a transmission mode in which data is transmitted on a single best spatial channel without spatial spreading, a transmission mode in which data is transmitted from a single transmit antenna, and so on, or any combination thereof.

FIG. 4 shows a flow diagram of a process 400 for performing rate selection in a wireless system. Initially, channel state information indicative of the received signal quality for a wireless channel used for data transmission is obtained (block 412). The channel state information may be in the form of received SNRS, initial rates, and so on, and may be determined by a receiving entity and sent to a transmitting entity. The age of the channel state information is determined (block 414). This may be achieved by determining the age of the (e.g., steered or unsteered MIMO) pilot from which the channel state information is derived. One or more final rates are then selected based on the channel state information, the age of the channel state information, and possibly other information (block 416). For example, the final rate(s) may be determined based on the transmission mode selected for use (e.g., steered or unsteered mode), a back-off factor that is dependent on the age of the channel state information (e.g., $SNR_{age\_bo}(n)$), a back-off factor that is dependent on the selected transmission mode (e.g., $SNR_{bo}^s$ or $SNR_{bo}^u$), the time variant characteristic of the wireless channel, and so on. Data is then processed and transmitted via the wireless channel in accordance with the selected final rate(s) (block 418).

The techniques described herein select a transmission mode and final rate(s) for data transmission based on the most current information available at the transmitting station A and the age of this information. The channel information used for transmission mode selection and the channel state information used for rate selection may be derived from the same or different MIMO pilots. Different transmission modes and rates may be selected for different frames based on the same information due to the aging of the information and possibly other factors.

As noted above, the transmission mode and rate selection techniques may be used for a multi-carrier MIMO system. Multiple carriers may be provided by orthogonal frequency division multiplexing (OFDM) or some other constructs. OFDM effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data. For a MIMO system that utilizes OFDM, spatial processing may be performed on each of the subbands used for data transmission.

For the steered mode, a channel response matrix H(k,i) may be obtained for each subband k in symbol period i and decomposed to obtain the $N_S$ eigenmodes of that subband. The singular values in each diagonal matrix $\Sigma(k,i)$, for $k=1 \ldots N_F$, may be ordered such that the first column contains the largest singular value, the second column contains the next largest singular value, and so on, or $\sigma_1(k,i) \geq \sigma_2(k,i) \geq \ldots \geq \sigma_{N_S}(k,i)$, where $\sigma_m(k,i)$ is the singular value in the m-th column of $\Sigma(k,i)$ after the ordering. When the singular values for each matrix $\Sigma(k,i)$ are ordered, the eigenvectors (or columns) of the associated matrices V(k,i) and U(k,i) for that subband are also ordered correspondingly. A "wideband" eigenmode may be defined as the set of same-order eigenmode of all $N_F$ subbands after the ordering. The m-th wideband eigenmode thus includes the m-th eigenmode of all subbands. Each wideband eigenmode is associated with a respective set of $N_F$ eigenvectors for the $N_F$ subbands. The transmission mode and rate selection may then be performed for the $N_S$ wideband eigenmodes, e.g., similar to that described above for a single-carrier MIMO system.

Figure 5:
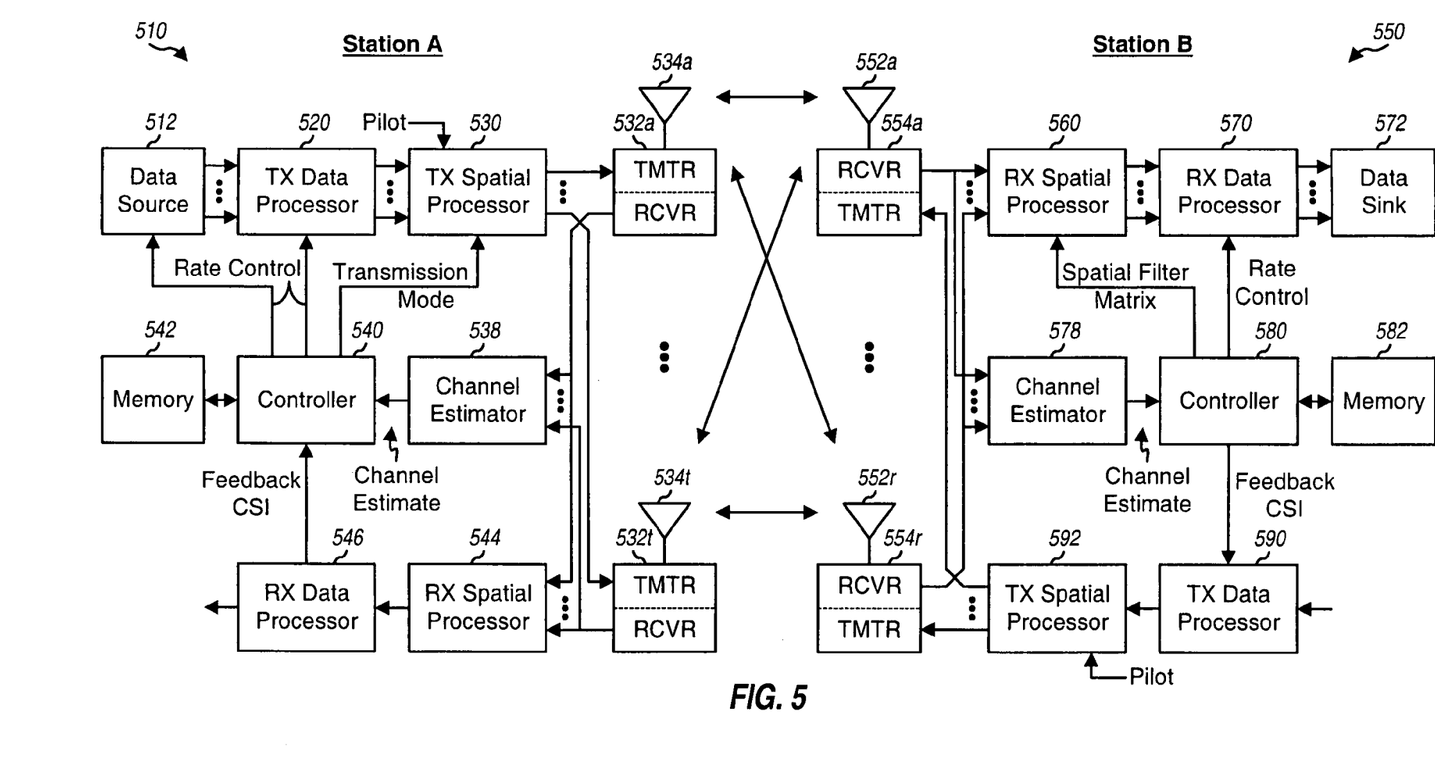
FIG. 5 shows a block diagram of stations A and B.

FIG. 5 shows a block diagram of transmitting station A 510 and receiving station B 550. At station A 510, a transmit (TX) data processor 520 receives traffic data from a data source 512, processes (e.g., formats, codes, interleaves, and modulates) the traffic data, and provides data symbols. For the steered mode, one data stream may be sent on each eigenmode, and each data stream may be encoded and modulated based on a final rate selected for that stream/eigenmode. For the unsteered mode, multiple data streams may be sent on multiple spatial channels, and one final rate may be used for all streams. A TX spatial processor 530 performs spatial processing on the data symbols and pilot symbols for the selected transmission mode and provides $N_T$ streams of transmit symbols to $N_T$ transmitter units (TMTR) 532a through 532t. Each transmitter unit 532 receives and conditions a respective transmit symbol stream to generate a corresponding modulated signal. $N_T$ modulated signals from transmitter units 532a through 532t are transmitted from $N_T$ antennas 534a through 534t, respectively.

At station B 550, $N_R$ antennas 552a through 552r receive the modulated signals transmitted by station A, and each antenna provides a received signal to a respective receiver unit (RCVR) 554. Each receiver unit 554 performs processing complementary to that performed by transmitter units 532 and provides received symbols. A receive (RX) spatial processor 560 performs spatial matched filtering on the received symbols from all $N_R$ receiver units 554 based on a spatial filter matrix M(n) and provides detected data symbols. The matrix M(n) is derived based on the selected transmission mode and the receiver processing technique selected for use (e.g., full-CSI, MMSE, or CCMD). An RX data processor 570 processes (e.g., symbol demaps, deinterleaves, and decodes) the detected data symbols and provides decoded data for station B.

Channel estimators 538 and 578 perform channel estimation for stations A and B, respectively. Controllers 540 and 580 control the operation of various processing units at stations A and B, respectively. Memory units 542 and 582 store data and program codes used by controllers 540 and 580, respectively.

For transmission mode and rate selection, channel estimator 578 may estimate the channel response for the MIMO channel from station A to station B and the received SNRs for the spatial channels of the MIMO channel. Controller 580 may determine initial rate(s) based on the received SNRs and provide feedback CSI, which may comprise the initial rate(s). The feedback CSI is processed by a TX data processor 590 and further multiplexed with pilot symbols and spatially processed for the steered or unsteered mode by a TX spatial processor 592 to generate $N_R$ transmit symbol streams. $N_R$ transmitter units 554a through 554r then condition the $N_R$ transmit symbol streams to generate $N_R$ modulated signals, which are sent via $N_R$ antennas 552a through 552r.

At station A 510, the modulated signals from station B are received by $N_T$ antennas 534 and processed by $N_T$ receiver units 532 to obtain received symbols for station B. The received symbols are further processed by an RX spatial processor 544 and an RX data processor 546 to obtain the feedback CSI from station B. Controller 540 receives the feedback CSI, selects the transmission mode and final rate(s) to use for data transmission to station B, provides a rate control to data source 512 and TX data processor 520, and provides the selected transmission mode and channel information (e.g., eigenvectors) to TX spatial processor 530.

The transmission mode and rate selection techniques described herein may be implemented by various means. For example, these techniques may be implemented in hardware, software, or a combination thereof. For a hardware implementation, the processing units used to perform transmission mode and rate selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmission mode and rate selection techniques may be implemented with modules (e.g., procedures, functions, and so on) that perform the functions described herein. The software codes may be stored in a memory unit (e.g., memory unit 542 and/or 582 in FIG. 5) and executed by a processor (e.g., controller 540 and/or 580). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of selecting a transmission mode and rate selection in a multiple-input multiple-output (MIMO) wireless communication system, comprising:

obtaining channel state information indicative of received signal quality for a wireless channel used for data transmission;

obtaining channel information used to transmit data on eigenmodes of a MIMO channel from a steered or unsteered MIMO pilot, wherein the steered MIMO pilot is a pilot sent on the eigenmodes of the MIMO channel and the unsteered MIMO pilot is a pilot comprised of N pilot transmissions sent from N transmit antennas;

determining the age of the channel information and the channel state information;

selecting a transmission mode from among a plurality of transmission modes based on the age of the channel information, wherein the plurality of transmission modes comprises a steered mode wherein data is transmitted on the eigenmodes of the MIMO channel and an unsteered mode wherein the channel information is not used to transmit data on spatial channels of the MIMO channel; and selecting at least one rate for data transmission based on the channel state information and the age of the channel state information, wherein data is transmitted via the wireless channel in accordance with the selected transmission mode and the selected at least one rate.

2. The method of claim 1, further comprising:

determining the age of a pilot used to derive the channel information, and wherein the age of the channel information is determined based on the age of the pilot; and determining the age of a pilot used to derive the channel state information, and wherein the age of the channel state information is determined based on the age of the pilot.

3. The method of claim 1, wherein the selecting one of the plurality of transmission modes comprises comparing the age of the channel information against a threshold, and selecting the steered mode if the age of the channel information is less than or equal to the threshold, and wherein the channel information is used for spatial processing to transmit data in the steered mode.

4. The method of claim 3, wherein the selecting one of the plurality of transmission modes further comprises selecting the unsteered mode if the age of the channel information is greater than the threshold.

5. The method of claim 3, further comprising:

determining the threshold based on a function of a time variant characteristic of the wireless channel.

6. The method of claim 1, wherein a plurality of rates are supported by the system, and wherein each of the at least one rate is selected from among the plurality of rates supported by the system.

7. The method of claim 6, wherein the channel state information comprises a plurality of initial rates for a plurality of spatial channels of a multiple-input multiple-output (MIMO) channel, one initial rate for each spatial channel.

8. The method of claim 7, wherein the selecting the at least one rate for data transmission comprises determining a required signal-to-noise-and-interference ratio (SNR) for each of the plurality of spatial channels based on the initial rate for the spatial channel, determining an SNR back-off based on the age of the plurality of initial rates, determining an adjusted SNR for each of the plurality of spatial channels based on the required SNR for the spatial channel and the SNR back-off, and determining a final rate for each of the plurality of spatial channels based on the adjusted SNR for the spatial channel, wherein data is transmitted on the plurality of spatial channels of the MIMO channel using a plurality of final rates determined for the plurality of spatial channels, and wherein the at least one rate selected for data transmission comprises the plurality of final rates.

9. The method of claim 7, wherein the selecting the at least one rate for data transmission comprises determining a required signal-to-noise-and-interference ratio (SNR) for each of the plurality of spatial channels based on the initial rate for the spatial channel, determining an SNR back-off based on the age of the plurality of initial rates, determining an adjusted SNR for each of the plurality of spatial channels based on the required SNR for the spatial channel and the SNR back-off, determining an average SNR for a plurality of adjusted SNRs determined for the plurality of spatial channels, and determining a final rate for the plurality of spatial channels based on the average SNR, wherein data is transmitted on the plurality of spatial channels using the final rate determined for the plurality of spatial channels, and wherein the at least one rate selected for data transmission comprises the final rate.

10. The method of claim 9, wherein the adjusted SNR for each of the plurality of spatial channels is further determined based on a second SNR back-off applicable when one final rate is used for the plurality of spatial channels.

11. The method of claim 1, further comprising:

determining a back-off factor based on the age of the channel state information, and wherein the at least one rate is further selected based on the back-off factor.

12. The method of claim 11, wherein the back-off factor is determined based on a function of time variant characteristic of the wireless channel.

13. The method of claim 1, further comprising:

determining a back-off factor based on a transmission mode selected for use for data transmission, wherein a plurality of transmission modes are supported by the system, and wherein the at least one rate is further selected based on the back-off factor.

14. An apparatus for selecting a transmission mode and rate selection in a multiple-input multiple-output (MIMO) wireless communication system, comprising:

a controller to obtain channel state information indicative of received signal quality for a wireless channel used for data transmission, to obtain channel information used to transmit data on eigenmodes of a MIMO channel from a steered or unsteered MIMO pilot, wherein the steered MIMO pilot is a pilot sent on the eigenmodes of the MIMO channel and the unsteered MIMO pilot is a pilot comprised of N pilot transmissions sent from N transmit antennas, to determine the age of the channel information and the channel state information, to select a transmission mode from among a plurality of transmission modes based on the age of the channel information, wherein the plurality of transmission modes comprises a steered mode wherein data is transmitted on the eigenmodes of the MIMO channel and an unsteered mode wherein the channel information is not used to transmit data on spatial channels of the MIMO channel, to select at least one rate for data transmission based on the channel state information and the age of the channel state information; and a spatial processor to spatially process data in accordance with the selected transmission mode and the selected at least one rate.

15. The apparatus of claim 14, wherein the controller determines the age of a pilot used to derive the channel information and determines the age of the channel information based on the age of the pilot; and determining the age of a pilot used to derive the channel state information, and wherein the age of the channel state information is determined based on the age of the pilot.

16. The apparatus of claim 14, wherein the controller compares the age of the channel information against a threshold and selects a steered mode if the age of the channel information is less than or equal to the threshold, and wherein the spatial processor uses the channel information for spatial processing in the steered mode.

17. The apparatus of claim 16, wherein the controller selects an unsteered mode if the age of the channel information is greater than the threshold, and wherein the spatial processor does not use the channel information for spatial processing in the unsteered mode.

18. An apparatus for selecting a transmission mode and rate selection in a multiple-input multiple-output (MIMO) wireless communication system, comprising:

means for obtaining channel state information indicative of received signal quality for a wireless channel used for data transmission;

means for obtaining channel information used to transmit data on eigenmodes of a MIMO channel from a steered or unsteered MIMO pilot, wherein the steered MIMO pilot is a pilot sent on the eigenmodes of the MIMO channel and the unsteered MIMO pilot is a pilot comprised of N pilot transmissions sent from N transmit antennas;

means for determining the age of the channel information and the channel state information; and means for selecting a transmission mode from among a plurality of transmission modes based on the age of the channel information wherein the plurality of transmission modes comprises a steered mode wherein data is transmitted on the eigenmodes of the MIMO channel and an unsteered mode wherein the channel information is not used to transmit data on spatial channels of the MIMO channel; and means for selecting at least one rate for data transmission based on the channel state information and the age of the channel state information, wherein data is transmitted via the wireless channel in accordance with the selected transmission mode and the selected at least one rate.

19. The apparatus of claim 18, further comprising:

means for determining the age of a pilot used to derive the channel information, and wherein the age of the channel information is determined based on the age of the pilot; and means for determining the age of a pilot used to derive the channel state information, and wherein the age of the channel state information is determined based on the age of the pilot.

20. The apparatus of claim 18, wherein the means for selecting one of the plurality of transmission modes comprises means for comparing the age of the channel information against a threshold, and means for selecting a steered mode if the age of the channel information is less than or equal to the threshold, and wherein the channel information is used for spatial processing to transmit data in the steered mode.

21. The apparatus of claim 20, wherein the means for selecting one of the plurality of transmission modes further comprises means for selecting an unsteered mode if the age of the channel information is greater than the threshold, and wherein the channel information is not used for spatial processing to transmit data in the unsteered mode.

22. An integrated circuit for selecting a transmission mode and rate selection in a multiple-input multiple-output (MIMO) wireless communication system, comprising:

a processor operable to:

obtain channel state information indicative of received signal quality for a wireless channel used for data transmission;

obtain channel information used to transmit data on eigenmodes of a MIMO channel from a steered or unsteered MIMO pilot, wherein the steered MIMO pilot is a pilot sent on the eigenmodes of the MIMO channel and the unsteered MIMO pilot is a pilot comprised of N pilot transmissions sent from N transmit antennas;

determine the age of the channel information and the channel state information;

select a transmission mode from among a plurality of transmission modes based on the age of the channel information, wherein the plurality of transmission modes comprises a steered mode wherein data is transmitted on the eigenmodes of the MIMO channel and an unsteered mode wherein the channel information is not used to transmit data on spatial channels of the MIMO channel; and select at least one rate for data transmission based on the channel state information and the age of the channel state information, wherein data is transmitted via the wireless channel in accordance with the selected transmission mode and the selected at least one rate.

* * * * *